(12) United States Patent
Klotzer

(10) Patent No.: US 8,587,616 B2
(45) Date of Patent: Nov. 19, 2013

(54) SYSTEMS, METHODS, AND ARTICLES OF MANUFACTURE FOR VIRTUAL DISPLAY

(75) Inventor: Jason Dieter Klotzer, Woodside, NY (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 12/971,815

(22) Filed: Dec. 17, 2010

(65) Prior Publication Data

US 2012/0154424 A1    Jun. 21, 2012

(51) Int. Cl.
   *G09G 5/00* (2006.01)
(52) U.S. Cl.
   USPC .......................................................... 345/635
(58) Field of Classification Search
   USPC .......................................................... 345/635
   See application file for complete search history.

(56) References Cited

U.S. PATENT DOCUMENTS

| | | | | |
|---|---|---|---|---|
| 6,919,910 | B2 * | 7/2005 | Chang ........................... | 345/635 |
| 7,068,291 | B1 * | 6/2006 | Roberts et al. ................ | 345/635 |
| 7,639,268 | B2 * | 12/2009 | Tsunoda ....................... | 345/635 |
| 8,026,928 | B2 * | 9/2011 | Takano et al. ................. | 345/619 |
| 8,179,384 | B2 * | 5/2012 | Sakashita et al. ............. | 345/204 |
| 8,310,582 | B2 * | 11/2012 | Yoon ........................ | 348/333.05 |
| 2006/0066638 | A1 * | 3/2006 | Gyde et al. ..................... | 345/635 |
| 2007/0030290 | A1 * | 2/2007 | Roberts et al. ................ | 345/635 |
| 2011/0084899 | A1 * | 4/2011 | Jung et al. ..................... | 345/156 |
| 2011/0148926 | A1 * | 6/2011 | Koo et al. ..................... | 345/635 |
| 2011/0219651 | A1 * | 9/2011 | Borreggine et al. ............ | 40/559 |

OTHER PUBLICATIONS

Splitview: http://www.splitview.com/; last visited on Jul. 13, 2012.
iShadow Virtual Display Manager: http://www.ishadow.com/?tabid=115; last visited on Jul. 13, 2012.
Winsplit Revolution: http://www.winsplit-revolution.com/; last visited on Jul. 13, 2012.
Twinsplay: http://www.twinsplay.com/; last visited on Jul. 13, 2012.
Acer Gridvista: http://www.softpedia.com/get/System/OS-Enhancements/Acer-Gridvista.shtml ; last visited on Jul. 13, 2012.

* cited by examiner

*Primary Examiner* — Ryan R Yang
(74) *Attorney, Agent, or Firm* — Hanley, Flight and Zimmerman, LLC

(57) ABSTRACT

Systems, methods, and articles of manufacture to virtually segment a display are disclosed. A disclosed example system includes a display abstraction component configured to interface, at a kernel level, between an operating system and a graphics processor, the display abstraction component to receive, adapt, and process display calls from the operating system and instruct the graphics processor to divide the display into multiple virtual displays according to a user specified virtual configuration preference to allow the display to replicate a multiple display configuration.

23 Claims, 5 Drawing Sheets

SYSTEMS, METHODS, AND ARTICLES OF MANUFACTURE FOR VIRTUAL DISPLAY

FIELD OF THE DISCLOSURE

This disclosure relates generally to virtual displays and, more particularly, to systems, methods, and articles of manufacture for virtual display segmentation.

BACKGROUND

Radiologists and other clinical users rely upon multi-display configurations for display of images and other clinical data, typically while using multiple applications simultaneously. Virtual display systems enable display real estate to be improved in the context of multiple applications by segmenting the display into a two-dimensional array of several smaller displays. This accomplishes the same effect of having multiple displays while eliminating the need for multiple hardware units.

Figure 1:
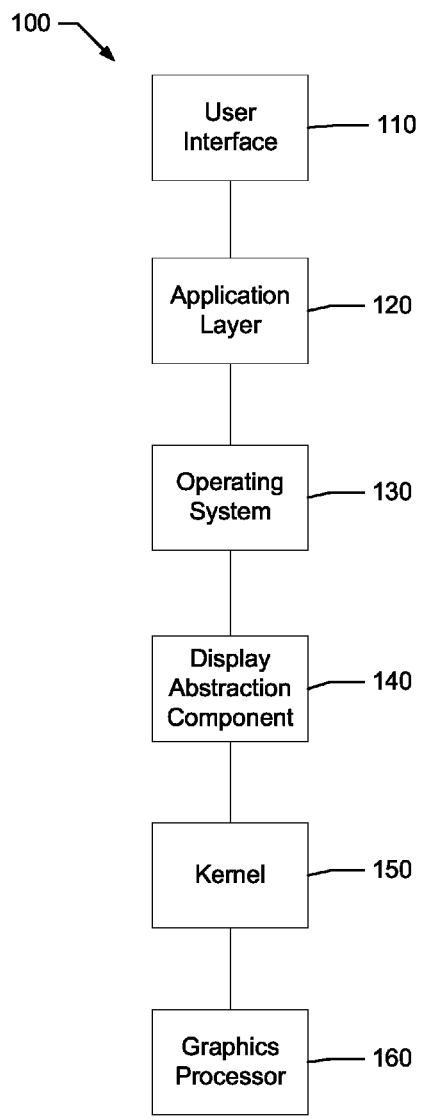
FIG. 1 illustrates an exemplary virtual display system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, Blu-ray, etc. storing the software and/or firmware.

To increase productivity, workers have historically been given multiple displays (monitors, for example) to be able to view multiple applications. In turn, these applications were built to accommodate a multi-display configuration, often each application occupying a separate display thus ensuring co-visibility of the applications in display-tiling style. The current trend is to replace a multiple display setup with fewer displays with higher resolution and larger dimensions to reduce the number of hardware units and to eliminate the seams between usable areas of the displays. Certain examples leverage this trend to provide improved solutions to users.

A computer display work area can be subdivided into smaller areas with different embedded functionality. While tools are available that allow a computer desktop to be segmented into multiple equal or unequal rectangles through manual designation or by dragging and resizing, this tiling is an incomplete solution because it requires manual adjustment. Furthermore, the tiling is not recognized by the operating system and is overridden, and, therefore, unreliable, in certain cases.

Certain examples disclosed herein enable a display's real estate to be improved by virtually segmenting the display into several smaller displays, wherein the virtual segmentation is known to the operating system and cannot be overridden by the configuration at the application level. The virtual configuration is emulated as an array of multiple displays, arranged in a two-dimensional array which is different from the actual physical array of electronic display components that are attached to the video card.

Example systems, methods, and articles of manufacture to virtually segment a display are disclosed. A disclosed example method includes virtually segmenting a computer display to improve physical display real estate by dividing a display into several smaller display, comprising installing a display abstraction component at the kernel, specifying a user configuration preference for the display abstraction component, receiving display calls from the operating system, adapting and processing said display calls interpreting the virtual display configuration, and instructing the graphics processor to segment the physical display according to the virtual display configuration.

A disclosed example article of manufacture includes storing machine-accessible instructions that, when executed, cause a machine to install a display abstraction component at the kernel, specify a user configuration preference for the display abstraction component, receive display calls from the operating system, adapt and process said display calls to interpret the virtual display configuration, and instruct the graphics processor to segment the physical display according to the virtual display configuration.

A disclosed example system comprises a display abstraction component configured to interface, at a kernel level, between an operating system and a graphics processor, the display abstraction component to receive, adapt, and process display calls from the operating system and instruct the graphics processor to divide the display into multiple virtual displays according to a user specified virtual configuration preference to allow the display to replicate a multiple display configuration.

FIG. 1 illustrates an example virtual display system 100. The example virtual display system 100 of FIG. 1 includes a user interface 110, an application layer 120, an operating system 130, a display abstraction component 140, a kernel 150, and a graphics processor 160. To view the segmented display and to interact with the end-user, the example user interface 110 of FIG. 1 can resize and display one or more applications to improve usage of display real estate beyond tiling, without requiring manual adjustment by a user. To provide a level of abstraction between the operating system 130 and the user interface 110, the example virtual display system 100 includes an example application layer 120. To process and adapt calls from the operating system 130 and graphics processor 160, the example virtual display system 100 includes a display abstraction component 140. The example display abstraction component 140 of FIG. 1 is inserted in communication between the operating system 130 and the device driver at the kernel 150, and intercepts communication messages in both directions and translates real world coordinates of the physical display into virtual coordinates and vice versa. The translation is necessary as the display abstraction component 140 emulates a virtual configuration of an array of multiple displays, arranged in a two-dimensional array which is different from the actual physical array of electronic display components that are attached to the video card. The virtually constructed array is visible to the operating system 130 while the real configuration is invisible to the operating system 130. The virtually constructed array is configurable as an array of virtual displays, each virtual display covering the non-overlapping rectangular area of a single physical display. The operating system 130 is aware of and utilizes the virtual display area(s) before the application is started, which allows for true segmentation of the display.

Example applications that may benefit from a virtual display system include, but are not limited to, medical imaging applications, mobile device applications, Internet applications, education and testing applications, messaging applications, gaming applications, financial applications, statistical applications, business enterprise applications, office suite applications, product engineering applications, video applications, and/or audio applications.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 4. As used herein, the term non-transitory computer-readable medium is expressly defined to include any type of computer-readable medium and to exclude propagating signals.

While an example virtual display system 100 is illustrated in FIG. 1, one or more of the elements, processes and/or devices illustrated in FIG. 1 may be combined, divided, rearranged, omitted, eliminated and/or implemented in any other way. Further, the example user interface 110, the example application layer 120, the example operating system 130, the example display abstraction component 140, the example kernel 150, and/or the example graphics processor 160 may be implemented by hardware, software, firmware and/or any combination of hardware, software and/or firmware. Thus, for example, any of example user interface 110, the example application layer 120, the example operating system 130, the example display abstraction component 140, the example kernel 150, and/or the example graphics processor 160 could be implemented by the example processor platform P100 of FIG. 4 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example user interface 110, the example application layer 120, the example operating system 130, the example display abstraction component 140, the example kernel 150, and/or the example graphics processor 160 are hereby expressly defined to include a tangible article of manufacture such as a tangible computer-readable medium storing the firmware and/or software. Further still, any of the example user interface 110, the example application layer 120, the example operating system 130, the example display abstraction component 140, the example kernel 150, and/or the example graphics processor 160 may include one or more elements, processes and/or devices in addition to, or instead of, those illustrated in FIG. 1, and/or may include more than one of any or all of the illustrated elements, processes and devices.

Figure 4:
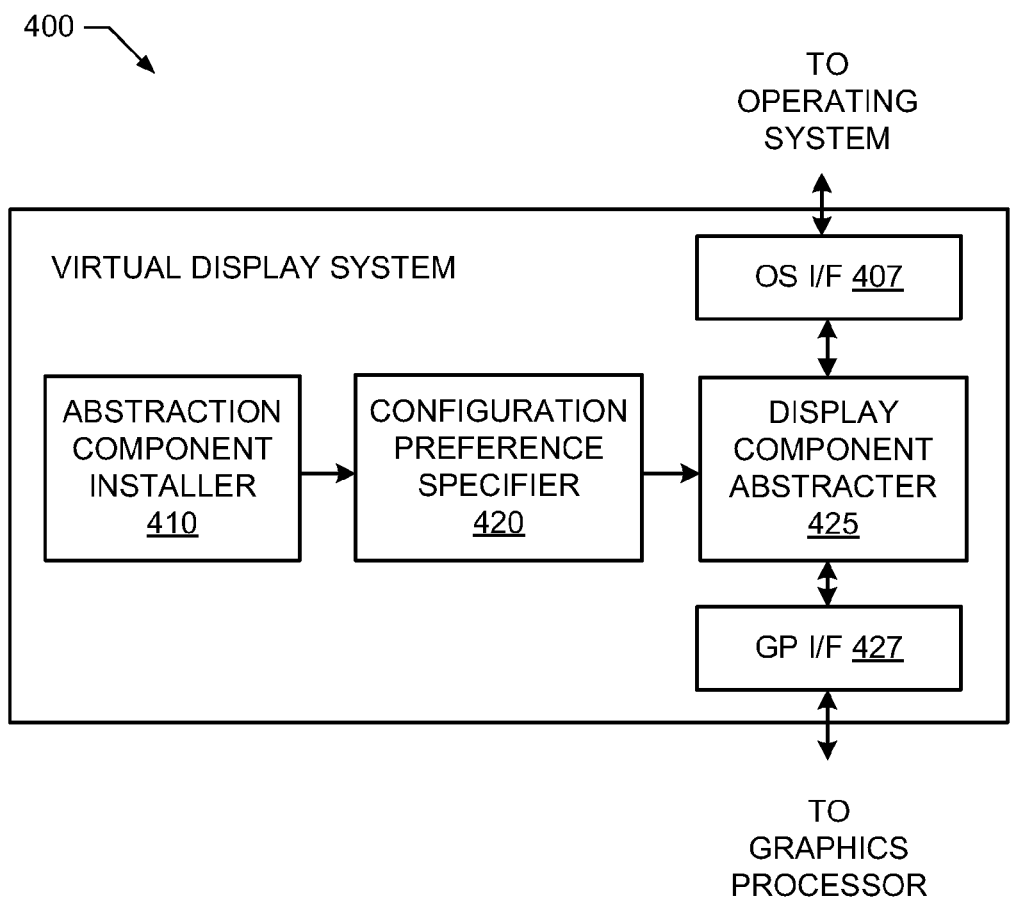
FIG. 4 illustrates an example manner of implementing the example virtual display system of FIG. 1.

FIG. 4 illustrates an example virtual display system 400 situated between an operating system and a graphics processor to configure one or more physical displays according to a virtual display layout.

To install a display abstraction component (e.g., the example display abstraction component 140), the example virtual display system 400 of FIG. 4 includes an abstraction component installer 410. The abstraction component installer 410 of FIG. 4 is executed to place a display abstraction layer or component (such as the example display abstraction component 140 shown in FIG. 1) at a kernel level (e.g., at the example kernel 150 shown in FIG. 1). To specify how the multiple displays are to be configured, the example virtual display system 400 of FIG. 4 includes a configuration preference specifier 420. The configuration preference specifier 420 of FIG. 4 indicates to the display component abstracter 425 what the improved display configuration should be based on the user's workload and application setup and profile.

To communicate with the operating system (e.g., the example operating system 160 shown in FIG. 1), the example virtual display system 400 of FIG. 4 includes any number and/or type(s) of operating system interface(s) 407. Using any number and/or type(s) of message(s), protocol(s), interface(s), method(s), logic and/or application programming interface(s), the example operating system interface 407 of FIG. 4 enables a display component abstracter 425 to intercept messages from the operating system in order to process and adapt the virtual configuration.

To communicate with the graphics processor (e.g., the example graphics processor 130 of FIG. 1), the example virtual display system 400 of FIG. 4 includes a graphics processor interface 427. Using any number and/or type(s) of message(s), protocol(s), interface(s), method(s), logic and/or application programming interface(s), the graphics processor interface 427 of FIG. 4 enables the display component abstracter 425 to instruct the graphics processor to display according to the virtual configuration.

To enable the multiple display configuration, the example virtual display system 400 of FIG. 4 includes a display component abstracter 425. The display component abstracter 425 intercepts communication messages in both directions, from both the operating system and the graphics processor, and translates real world coordinates into virtual coordinates and vice versa.

While a manner of implementing the example virtual display system 400 is illustrated in FIG. 4, one or more of the elements, processes and/or devices illustrated in FIG. 4 may be combined, divided, re-arranged, omitted, eliminated and/or implemented in any other way. Further, the example operating system interface 407, the example abstraction component installer 410, the example configuration preference specifier 420, the example display component abstracter 425, the example graphical processing unit interface 427 and/or, more generally, the example virtual display system 400 may be implemented by hardware, software, firmware and/or any combination of hardware, software and/or firmware. Thus, for example, any of the example operating system interface 407, the example abstraction component installer 410, the example configuration preference specifier 420, the example display component abstracter 425, the example graphical processing unit interface 427 and/or, more generally, the example virtual display system 400 could be implemented by the example processor platform P100 of FIG. 5 and/or one or more circuit(s), programmable processor(s), application specific integrated circuit(s) ASIC(s), PLD(s) and/or FPLD(s), FPGA(s), fuses, etc. When any apparatus claim of this patent incorporating one or more of these elements is read to cover a purely software and/or firmware implementation, at least one of the example operating system interface 407, the example abstraction component installer 410, the example configuration preference specifier 420, the example display component abstracter 425, the example graphical processing unit interface 427 and/or, more generally, the example virtual display system 100 are hereby expressly defined to include a tangible article of manufacture such as a tangible computer-readable medium storing the firmware and/or software. Further still, the example virtual display system 400 may include one or more elements, processes and/or devices in addition to, or instead of, those illustrated in FIG. 4, and/or may include more than one of any or all of the illustrated elements, processes and devices.

Figure 2:
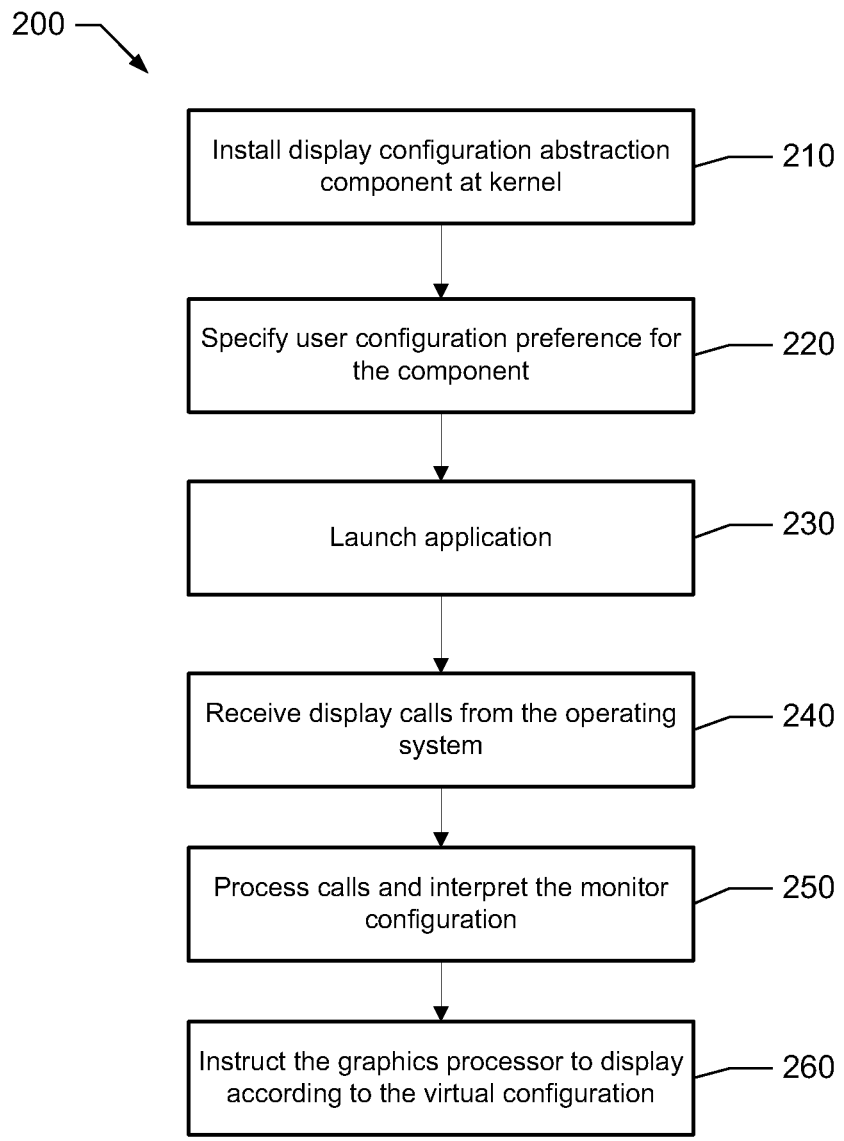
FIG. 2 illustrates a flowchart representative of an example method of virtually segmenting a computer display.

FIG. 2 is a flowchart representing an example process that may be embodied as machine-accessible instructions and executed by, for example, one or more processors to configure a virtual display. A processor, a controller and/or any other suitable processing device may be used, configured and/or programmed to perform the example processes of FIG. 2. For example, the process of FIG. 2 may be embodied in coded instructions stored on a tangible computer-readable medium. Machine-readable instructions comprise, for example, instructions that cause a processor, a computer and/or a machine having a processor to perform one or more particular processes. Alternatively, some or all of the components of the example process of FIG. 2 may be implemented using any combination(s) of ASIC(s), PLD(s), FPLD(s), FPGA(s), fuses, discrete logic, hardware, firmware, etc. Also, some or all of the components of the example process of FIG. 2 may be implemented manually or as any combination of any of the foregoing techniques, for example, any combination of firmware, software, discrete logic and/or hardware. Further, many other methods of implementing the example operations of FIG. 2 may be employed. For example, the order of execution of the blocks may be changed, and/or one or more of the blocks described may be changed, eliminated, sub-divided, or combined. Additionally, the blocks of any or all of the components of the example process of FIG. 2 may be carried out sequentially and/or carried out in parallel by, for example, separate processing threads, processors, devices, discrete logic, circuits, etc.

The example process of FIG. 2 begins with a display abstraction component being installed at the kernel (block 210) by the abstraction component installer 410. This is so that user cases of application space management supported by the operating system (e.g., resizing, background/foreground operations, etc.) are automatically aligned within the configured virtual display area, for example. The process of FIG. 2 specifies a user configuration preference for the component (block 220) by the configuration preference specifier 420. Doing this will cause the virtual display areas to be known to the operating system and enumerated and used before an application is started. The configuration preference can be specified in any number of ways, such that any number of rectangular displays of any size can potentially be the end result of the virtual display. When an application is launched (block 230) the virtual displays are already known to the operating system. Thus, when an application is launched (block 230), display calls are received from the operating system (block 240) by the display configuration abstraction component 140 and processed to interpret the virtual display configuration (block 250). Implementation of this portion of the process is achieved using the display component abstracter 425, for example. During the process shown in FIG. 2, the display abstraction component instructs the GPU to display according to the virtual configuration (block 260).

The example process of FIG. 2 can also include testing of multiple display configurations on a single display, fine tuning of application usability for different display configurations, application smart organizing and context management linking, emulation of grayscale, color, and tint, as well as color calibration of displays uniformly between displays.

Figure 3:
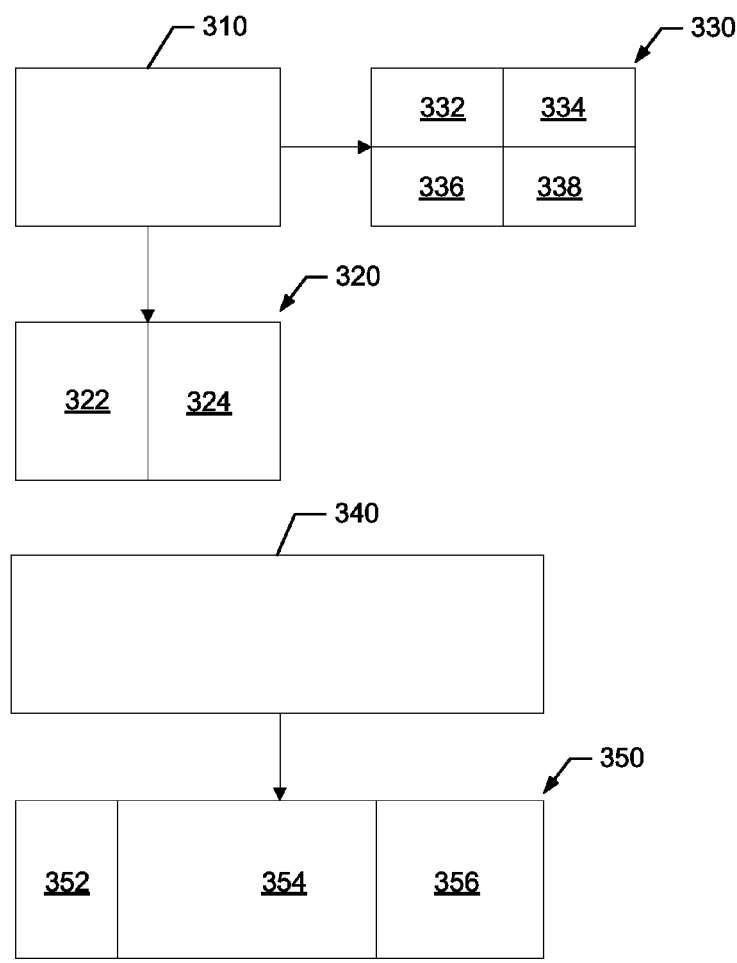
FIG. 3 illustrates example results of a virtual display system.

FIG. 3 illustrates example results of a virtual display system 100. The original display 310 can be segmented any number of ways. The quad segmentation 330 results in four equally sized displays 332, 334, 336, 338 whereas the dual segmentation 320 results in two equally sized displays 322, 324. The virtual display system 100 can accommodate larger displays as well, such as a large original display 340. Additionally, the displays can be segmented into smaller displays of equal or unequal size. In FIG. 3, the large display 340 has been segmented into three smaller displays 352, 354, 356 of unequal size.

Figure 5:
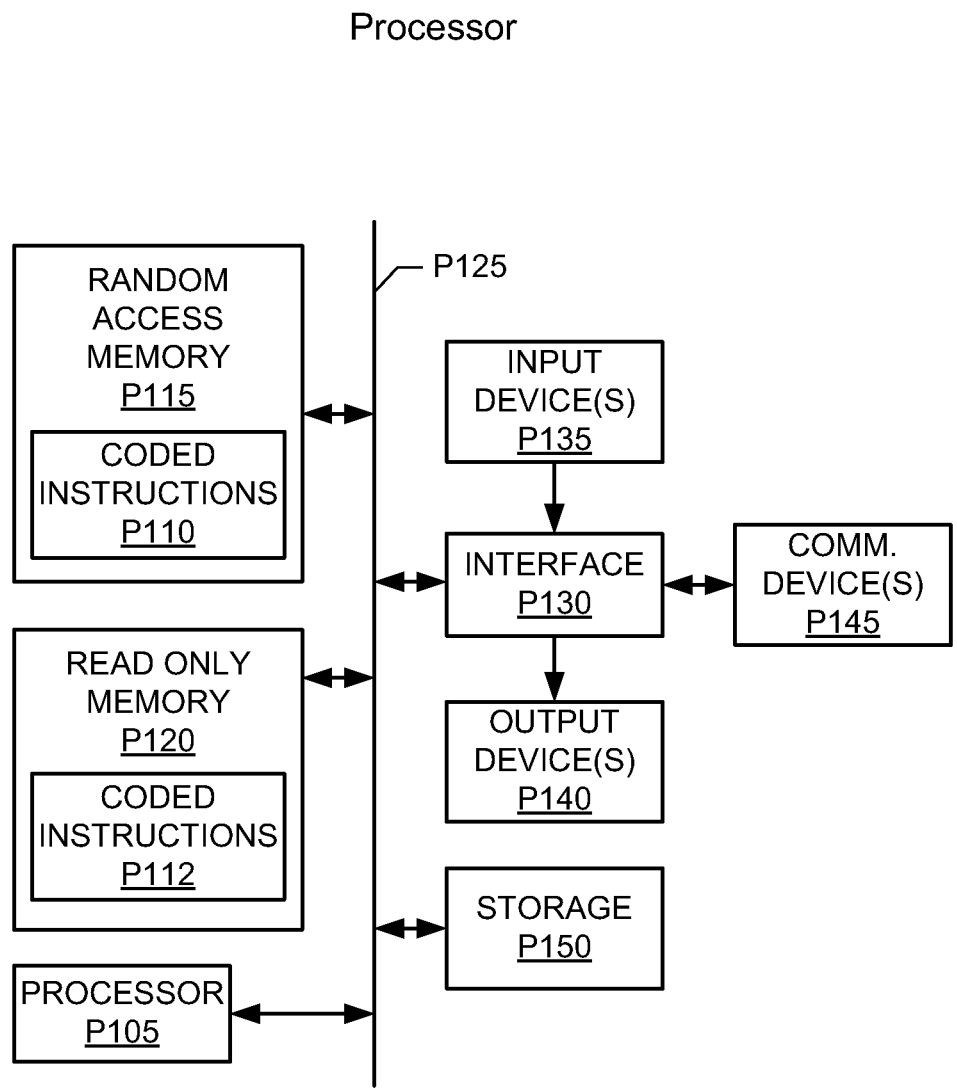
FIG. 5 is a schematic illustration of an example processor platform that may be used and/or programmed to implement any or all of the disclosed examples to virtually segment a computer display.

FIG. 5 is a block diagram of an example processor platform P100 capable of executing the example process of FIG. 2 to virtually segment a display into a two-dimensional array of multiple displays. The example processor platform P100 can be, for example, a computer, a workstation, a server and/or any other type of computing device containing a processor.

The processor platform P100 of the instant example includes at least one programmable processor P105. For example, the processor P105 can be implemented by one or more Intel® microprocessors from the Pentium® family, the Itanium® family or the XScale® family. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIG. 2 to virtually segment a display into a two-dimensional array of multiple displays. Thus, the coded instructions P110, P112 may include the example instructions of FIG. 2.

The processor P105 is in communication with the main memory including the non-volatile memory P110 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P110 may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

The interface circuit P130 may also includes one or more communication device(s) P112 such as a network interface card to facilitate exchange of data, packets, and/or routing information with other nodes, servers, devices and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive and/or any other solid-state, magnetic and/or optical storage device. The example storage devices P150 may be used to, for example, store the example coded instructions of FIG. 2 and/or the display component abstracter 425 of FIG. 4.

Thus, certain examples provide a way to virtually segment a display into an array of multiple displays, thereby improving physical display real estate and reducing the amount of unused seams between displays while eliminating the need for more hardware units. The segmentation of the display is based on end-users' workflow and profile and is independent of any particular application. The examples described herein segment a display such that the segmented virtual configuration is known and visible at the operating system level while the real configuration is not known to the operating system. Thus, the virtual display does not require manual intervention. Moreover, the virtual display can be easily implemented through the use of an abstraction component at the kernel, which receives, processes, and adapts instructions from the kernel and directs a graphics processor to segment the display based on a user specified configuration.

Although certain example methods, apparatus and articles of manufacture have been described herein, the scope of coverage of this patent is not limited thereto. On the contrary, this patent covers all systems, methods, apparatus and articles of manufacture fairly falling within the scope of the claims of this patent.

What is claimed is:

1. A virtual display segmentation system comprising:
a display abstraction component configured to interface, at a kernel level, between an operating system and a graphics processor, the display abstraction component to receive, adapt, and process display calls from the operating system and instruct the graphics processor to divide the display into multiple virtual displays according to a user specified virtual display configuration preference to allow the display to replicate a multiple display configuration.

2. The system of claim 1, wherein the display abstraction component is loaded by the operating system upon initialization.

3. The system of claim 1, wherein the virtual display configuration takes precedence over the real display configuration at the operating system level, rendering the real display configuration opaque to the operating system.

4. The system of claim 1, wherein the display abstraction component intercepts communication messages from both the operating system and graphics processor and translates real world coordinates into virtual coordinates and vice versa to enable the proper display configuration.

5. The system of claim 1, wherein the display abstraction component segments the display into an array of multiple displays, arranged in a two dimensional array different from the actual physical array of electronic display components that are attached to a video card.

6. The system of claim 1, wherein implementation is achieved by installing a display abstraction component plug into the communication line between the operating system and a display driver.

7. The system of claim 1, wherein the virtual display configurations can be saved and loaded at the operating system level.

8. The system of claim 1, wherein the virtual displays are configured automatically and in real time when an application is launched.

9. The system of claim 1, wherein the virtual display configuration setup depends on the user's end workflow.

10. The system of claim 1, wherein the virtual display configuration is enabled such that it can be used with various hardware solutions.

11. The system of claim 1, wherein a resolution is defined by the display abstraction component for each segmented display area.

12. The system of claim 1, wherein the system can accommodate more displays than a digital development processing algorithm (ddp) was expecting to allow the ddp to work with more virtual displays than physical displays.

13. The system of claim 1, wherein the virtual display configuration is enumerated and used before an application is started.

14. A method of virtually segmenting a computer display to improve physical display real estate by dividing a display into several smaller displays, comprising:
installing a display abstraction component at a kernel; and
specifying a user virtual display configuration preference for the display abstraction component; and
receiving display calls from an operating system; and
adapting and processing said display calls interpreting the virtual display configuration; and
instructing a graphics processor to segment the physical display according to the virtual display configuration.

15. The method of claim 14, further comprising fine tuning of application usability for different display configurations.

16. The method of claim 14, further comprising smart application organizing and context management linking.

17. The method of claim 14, further comprising emulating of grayscale, color, and tint of the segmented virtual display.

18. The method of claim 14, further comprising color calibrating of the display uniformly between displays.

19. A computer readable storage medium including a set of instructions for a computer that improve physical display real estate by dividing a display into several smaller displays, said instructions including routines to:
install a display abstraction component at a kernel; and
specify a user virtual display configuration preference for the display abstraction component; and
receive display calls from an operating system; and
adapt and process said display calls to interpret the virtual display configuration; and
instruct a graphics processor to segment the physical display according to the virtual display configuration.

20. The computer readable storage medium of claim 19, further comprising instructions to fine tune application usability for different display configurations.

21. The computer readable storage medium of claim 19, further comprising instructions for smart application organizing and context management linking.

22. The computer readable storage medium of claim 19, further comprising instructions for emulating of grayscale, color, and tint of the segmented display.

23. The computer readable storage medium of claim 19, further comprising instructions for color calibrating of the display uniformly between displays.

* * * * *